J. Dědek
J. Vasatko
INVENTORS

Patented July 9, 1935

2,007,424

UNITED STATES PATENT OFFICE 2,007,424

PROCESS FOR REMOVING COLLOIDAL SUBSTANCES FROM LIQUIDS OF VEGETABLE OR ANIMAL ORIGIN

Jaroslav Dědek and Josef Vašatko, Brunn, Czechoslovakia

Application October 27, 1932, Serial No. 639,874
In Czechoslovakia September 25, 1931

1 Claim. (Cl. 127—48)

Numerous technically important liquids of vegetable or animal origin contain colloids, particularly lyophile substances, which have to be removed therefrom.

The removal is effected amongst other methods, chiefly by additions of precipitating agents. These act either with their OH-ions or H-ions or, generally speaking, with cations or anions, more particularly polyvalent ions, such as, for example, Pb, Ca, Ba, or $PO_4$, $CO_2$, $SO_2$ and the like.

It is known that a complete precipitation requires a perfectly definite proportion of precipitating agent with respect to the colloidal substance. In the case of a precipitation carried out by the action of OH-ions or H-ions it is a question of attaining the so-called isoelectric point. Smaller additions of the precipitating agent are insufficient, larger additions cause redissolution (peptizing) of a part of the precipitate and the precipitation is then not so complete.

Figure 1:
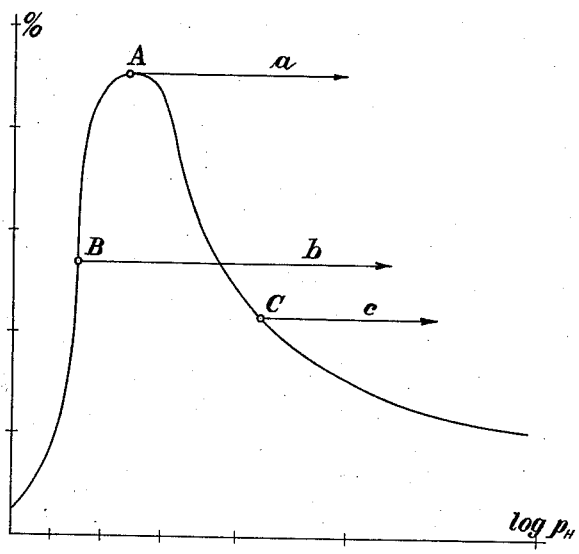

These conditions are reproduced in Figure 1 of the accompanying drawing, which figure shows a curve representing the percentage quantity of coagulated substances (the ordinate) as a function of the concentration of the hydrogen or hydroxyl ions (pH), when the clarifying agent is added all at once. The curve is characterized by an optimum coagulation, in the present case at a definite pH value, but in general at a definite concentration of the ions effecting the precipitation. By raising the addition of the clarifying agent the quantity of coagulated substances is diminished in the direction AC.

Technical solutions, such as, for example, beet juice, also consist of a mixture of heterogeneous substances of varying composition, whereby the position of the optimum coagulation may be displaced for different juices either towards the alkaline or the acidic direction, or, generally speaking, may require a varying concentration of the added electrolyte. This position also depends on various technical factors, such as, in the case of beet sugar manufacture, on the work of diffusion, the degree of dilution, the pressure under which the beet pulp is pressed, etc. The clarification optimum, therefore, cannot be continuously controlled during operation in the case of a rapidly flowing juice. If a constant quantity of clarifying agent for the preliminary clarification of the juice could be determined, as is the case in all the clarification processes heretofore carried out, and if in these, for example, the lime is added in several parts, then either the clarification optimum would be accidentally found or else the juice would be incompletely clarified (for example, point B) or over clarified (for example, point C). The point B represents an example of incomplete clarification on the ascending portion of the curve, whilst the point C, on the other hand, represents an over clarification on the descending portion of the curve. These facts make operation on a large scale difficult and consequently diminish the practical value of these methods for removing colloidal substances. When it is a question of maintaining a definite hydrogen ion concentration (pH) and when it is known what this concentration ought to be, it is possible to determine the correct addition of precipitating agent by ascertaining the pH value. However, these measurements have up to now been very difficult to carry out in practice and indeed in many cases impossible (e. g. when working with $SO_2$ and the like.)

When it is a question of precipitating with metal cations then assistance is obtained by ascertaining the distinct excess of precipitating agent in the filtrate, e. g. as in the case of the purification of juices for the preparation of digitalis in accordance with Prof. Wiechowsky's method. This method, however, is very inaccurate and consequently only very seldom is an optimum purification obtained.

It is generally known that the precipitating reactions described proceed comparatively slowly (corresponding to the temperature and concentration chosen, and the like) and a definite time is necessary for the complete formation of the precipitate. It is apparent from Figure 2, which represents the results of our own experiments with beet juice, that, corresponding to the time, in the first place the quantity of precipitate rises to a definite maximum and then sinks again. A complete purification (clarification) therefore, requires not only a suitable addition of precipitating agent but also a definite optimum temperature and duration of heating. In this way the practical employment of the process is rendered more difficult still. Furthermore, the maximum of the precipitate is attained in various times according to the quantity of precipitating agent added and the temperature chosen.

The degree of clarification produced, however, is insufficient in many cases and it is necessary to subject the juices, in addition, to other subsequent purification processes, such as, for example, in beet sugar manufacture to two or more saturations or the like.

Nevertheless, the advantages obtained by a perfectly effected clarification are very great. Even in beet sugar manufacture the quantity of clarifying agent necessary (for example, CaO) can be extensively diminished and neutralization can be effected in a further operation, for example, in the saturation with carbonic acid, sulphurous acid or phosphoric acid, much further than in the case of the usual working processes, (far below an alkalinity of 0.1 or 0.8% CaO) without there being any appearance of so-called super-saturation, i. e. a redissolution of the precipitated substances. At the same time the filtering capability of these juices is much higher, which brings about a saving in filtration material.

Figure 2:
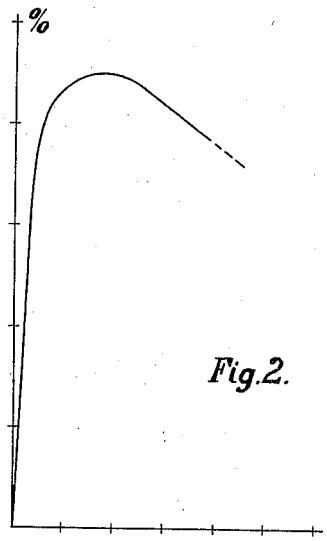

It is apparent from Figure 2 that the precipitate redissolves after some time, particularly if no clarification corresponding to the optimum has been effected. Since it is not known beforehand in what time the clarification maximum is produced, and since the further purification operations cannot always be carried out without exceeding the optimum clarification time, there is always the danger that a part of the success obtained in the purification is lost. It is advantageous, therefore, to separate the clarification precipitate in the correct time and only then to subject the juice to a further purification.

Some experiments, for example, with the diffusion juice, gave the following results:

The juice, preliminarily cleared by means of a small quantity of CaO but not centrifuged, yielded on subsequent saturation with 1.4% lime a light juice of substantially inferior quality than the same preliminarily cleared but centrifuged juice which had been saturated with only half the addition (0.7%) of lime.

In practice this separation of the precipitate proceeds satisfactorily only by centrifuging since filtration takes place only very slowly. The centrifuging must above all be carried out at a high rotational speed (preferably by means of so-called super-centrifuges) which again adds difficulty and expense to the work in practice.

The purification process described would be extraordinarily improved if a process which can be readily carried out, and which preferably is automatic, could be found for ascertaining the optimum addition of precipitating agent and if the precipitation could be carried out in such a way that the precipitate formed would not redissolve to a measurable extent in a time coming into consideration in practice by a necessary or accidental excess of clarifying agents.

In the experiments which have been carried out it was observed that the time and temperature in the clarification according to Figure 2 not only raise the quantity of precipitate formed but at the same time vary the solubility thereof, i. e. the capability of peptization by means of the excess of precipitating agents.

Whereas the precipitate just formed, e. g. at the point A, is dissolved up again by a further addition of clarifying agent, according to the curve AC the precipitate heated for a suitable length of time is practically insoluble. The quantity precipitated no longer changes on a further addition of clarifying agent.

If therefore the correct clarifying optimum and a stabilization by precipitation, temperature and time is attained the addition of clarifying agent may be further raised as desired, whereby the quantity of precipitate corresponding to Figure 1 moves from the point A along the straight line $a$.

It is very surprising that even in incompletely clarified juices (point B) a direct addition of excess of precipitating agent does not bring about an optimum clarification (e. g. up to point A), but the quantity precipitated remains almost unchanged (in the direction B—$b$).

Further experiments have established that in particular the coagulation optimum can be fixed with respect to a further addition of acid or alkaline clarifying agents if the solution is suitably heated for a definite time in this optimum. Such a stabilized precipitate, is, therefore, practically irreversible and is not changed by a further change in the concentration of the precipitating ions. In the case of hydrogen or hydroxyl ions one can pass with these from the alkaline range to the acid range or vice-versa practically without dissolving it up; it changes only in appearance. It is not necessary, therefore, before a further change in the reaction conditions to separate by centrifuging the precipitate formed by an over-clarification under prevailing conditions, as a result of which the work is very much simplified and cheapened in practice and in this way a considerable technical advance is obtained.

This knowledge, however, also renders possible a perfectly automatic and certain process for attaining optimum clarification. It is sufficient if the clarifying agent is added at a suitable temperature so slowly that the precipitate which forms as a result of the individual additions simultaneously loses its solubility in an excess of the clarifying agent.

It has been found as the result of a series of experiments that by means of the smallest additions of clarifying agent added one after the other to the suitably heated juice in definite time intervals, the optimum can be obtained for every juice. One moves from this optimum further along the line $a$ (Figure 1) if the further additions are also optionally effected. The small increased additions of clarifying agent, however, may also be replaced by an uninterrupted slow stream of the clarifying agent into the excess of juice at a suitable temperature whilst uninterrupted stirring is effected. The quantity of clarifying agent added in unit time must not exceed a definite maximum value. It is sufficient, however, to add in this way the first portion just up to the optimum or shortly before same. In the manufacture of sugar the addition of the first quantity of 0.3 to 0.5% CaO for example, must not last less than about 15–20 minutes at a temperature of, for example 80–95° C. In this way a stable precipitate is produced in the solution in which, by a further addition of clarifying agent, only, for example, the acid or alkaline reaction is intensified, whilst the quantity of precipitate changes according to the straight line A$a$, that is to say, it remains unaltered. The perfect clarification of any given beet juice is produced, therefore, when a solution of the clarifying agent is added, first of all in a slow stream or in small additions of the solid clarifying agent, to the excess of sufficiently heated juice, as a result of which a stable precipitate is formed which always corresponds to the reaction optimum. Bearing in mind the shape of the curve in Figure 2, however, heating during any optional period of time is not permissible, but here also the optimum conditions as regards time must be borne in mind.

In practice this clarification process may be carried out, for example, in sugar works with the aid of lime, as follows: Milk of lime is first of all introduced from the measuring vessel into a container provided with a stirring device, which container is situated above each malaxator. The malaxators are first of all filled with the sufficiently heated juice in which the milk of lime is introduced in a small stream from the stirring vessel, the whole being continuously stirred during the introduction, and the stream being regulated by a valve on the stirring container. When about 0.3-0.5% CaO have been added in a time of 15 to 20 minutes the rest of the lime is added all at once, the amount of this remaining quantity being regulated by the requirements of the individual operation. After mixing in the malaxator the contents are allowed to flow out. The addition of milk of lime may be replaced by clarification with dry lime, which is added in the first working period in portions, and in a further working period, if necessary, all at once.

The advantages of this process are as follows: The degree of purification of solutions cleared in such a way is raised. The removal of the colloidal substances is more complete. The quantity of clarifying agent added is diminished to a minimum. As a result in sugar factories, for example, much lime is saved. It is possible, therefore, for sugar factories to buy the lime so that lime kilns can be dispensed with. The separation of the slime formed by preliminary clarification is obviated and as a result the expensive and inconvenient operations with centrifuges or with asbestos or the like mud filters are dispensed with. The filtration is improved as a result. Saving is effected in filteration material. In the manufacture of sugar the saturation is facilitated since a lower alkalinity can be attained in the first saturation bearing in mind the more stable precipitate.

What we claim is:

A method of removing colloidal substances from sugar juices consisting in adding at least the optimum quantity of lime to the continuously stirred heated juice, the lime being added at first in small quantities until 0.3-0.5% CaO have been added over a period of 15 to 20 minutes and the remainder being thereupon added all at once.

JAROSLAV DĚDEK.
JOSEF VAŠATKO.